United States Patent [19]

Okino et al.

[11] Patent Number: 5,740,337
[45] Date of Patent: Apr. 14, 1998

[54] STEREOSCOPIC IMAGING SYSTEM WITH ELECTRONICALLY CONTROLLED CONVERGENCE ANGLE

[75] Inventors: Toshiyuki Okino, Kadoma; Haruhiko Murata, Takatsuki; Toshiya Iinuma, Moriguchi; Hideyuki Kanayama, Kadoma, all of Japan

[73] Assignee: Sanyo Electric Co., Ltd., Osaka, Japan

[21] Appl. No.: 763,921

[22] Filed: Dec. 12, 1996

Related U.S. Application Data

[63] Continuation of Ser. No. 264,860, Jun. 23, 1994, abandoned.

[30] Foreign Application Priority Data

Jun. 25, 1993 [JP] Japan ............................. 5-155259

[51] Int. Cl.$^6$ ................................................ G00T 3/00
[52] U.S. Cl. ............................ 395/119; 356/11; 356/12
[58] Field of Search .......................... 358/88; 348/42–53; 352/57; 356/11, 12; 359/375–8, 458, 462–73; 600/166–7; 395/118–19, 133

[56] References Cited

U.S. PATENT DOCUMENTS

| 4,723,159 | 2/1988 | Imsand | 358/88 |
|---|---|---|---|
| 4,799,763 | 1/1989 | Davis et al. | 350/137 |
| 4,819,064 | 4/1989 | Diner | 358/88 |
| 4,962,422 | 10/1990 | Ohtomo et al. | 358/88 |
| 5,034,809 | 7/1991 | Katoh | 358/88 |
| 5,063,441 | 11/1991 | Lipton et al. | 358/88 |
| 5,065,236 | 11/1991 | Diner | 358/88 |
| 5,073,914 | 12/1991 | Ashina et al. | 378/42 |
| 5,119,189 | 6/1992 | Iwamoto et al. | 358/88 |
| 5,140,415 | 8/1992 | Choquet | 358/88 |
| 5,142,357 | 8/1992 | Lipton et al. | 358/88 |
| 5,175,616 | 12/1992 | Milgram et al. | 358/88 |
| 5,383,013 | 1/1995 | Cox | 356/2 |

FOREIGN PATENT DOCUMENTS 01093727   4/1989   Japan.

OTHER PUBLICATIONS

Maeda, Taro et al. "Space Perception Model which Generates Horopter," Neural Networks, pp. 1426–1433 (1991).

*Primary Examiner*—Joseph H. Feild
*Assistant Examiner*—Rudolph Buchel
*Attorney, Agent, or Firm*—Loeb & Loeb LLP

[57] ABSTRACT

A stereo-graphic apparatus has first and second imaging devices to provide a first image and a second image, respectively. The first and the second imaging device are spaced from each other to define a predetermined convergence angle. A distance detecting apparatus detects distance from the first and the second imaging device to an object for imaging. A first electric zooming apparatus receives a signal from the first imaging device and extracts image data of a predetermined area from the first image. A second electric zooming apparatus receives a signal from the second imaging device and extracts image data of a predetermined area of image. A control device controls the extraction of image data according to the distance information. According to the distance information, the extracting area is moved so that the focused object is located on the center of each of the provided images. As a result, the convergence angel is substantially changed according to the distance between the object and the imaging device.

9 Claims, 7 Drawing Sheets

STEREOSCOPIC IMAGING SYSTEM WITH ELECTRONICALLY CONTROLLED CONVERGENCE ANGLE

This is a continuation of application Ser. No. 08/264,860, filed on Jun. 23, 1994, now abandoned.

FIELD OF THE INVENTION

The present invention relates to a stereoscopic imaging system. More particularly, the present invention relates to a stereoscopic imaging system in which a convergence angle is electronically controlled according to a distance from an object to the camera.

BACKGROUND OF THE INVENTION

Figure 6:
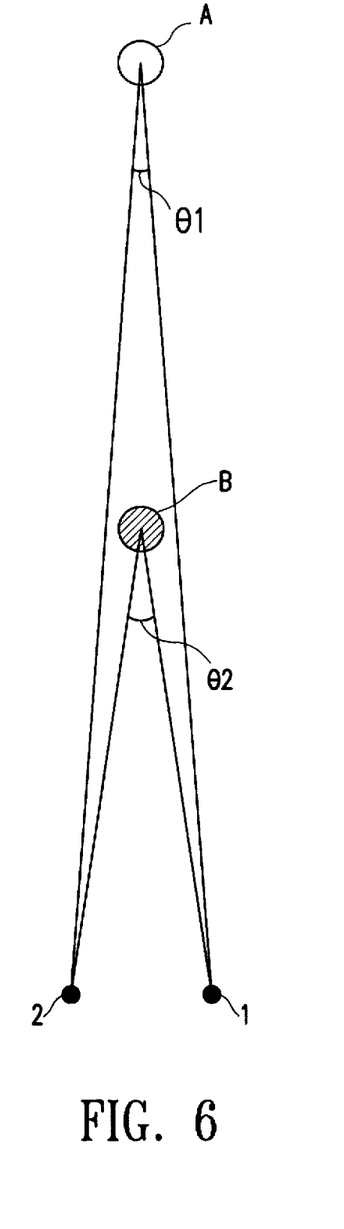
FIG. 6 is an explanatory view of a convergence angle defined by two cameras focused on one image.
Figure 7A:
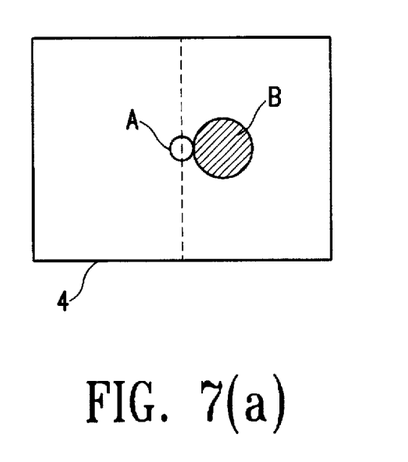
FIG. 7(a) and 7(b) are explanatory views in which the convergence angle of two cameras is matched to an object A shown in FIG. 6.
Figure 7B:
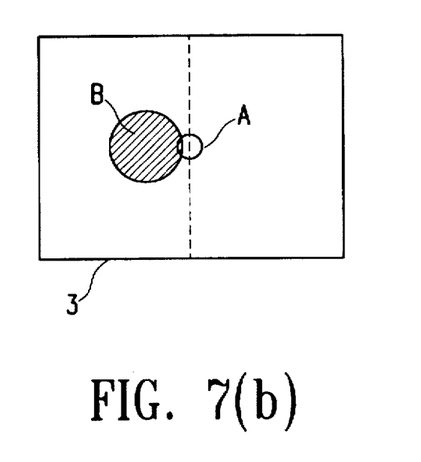
Figure 8A:
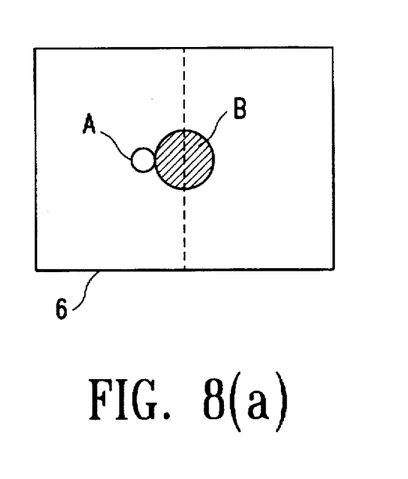
FIG. 8(a) and 8(b) are explanatory views in which the convergence angle of two cameras is matched to an object B located closer to the cameras than the object A shown in FIG. 6.
Figure 8B:
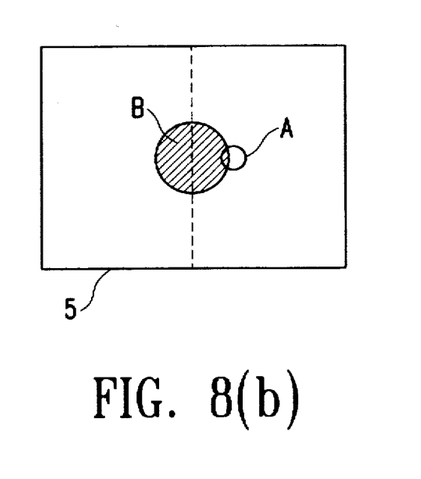

To achieve a good stereoscopic image, it is important to adjust the convergence angle of the cameras in accordance with the distance from an object. Referring to FIG. 6, a detailed explanation will be made. A stereoscopic imaging system typically has two cameras, namely a right camera 1 and a left camera 2, which are used to obtain a stereo-graphic image. The distance between the object A and the cameras 1 and 2 is greater than the distance between the object B and the cameras 1 and 2. When an image of the object A is focused, as shown in FIG. 7, the image of the object A should preferably be centered in both image frames 3 and 4 of the right camera 1 and the left camera 2, respectively. On the other hand, when an image of the object B is focused, as shown in FIG. 8, it is preferable that the image of the object B is centered in image frames 5 and 6 of the right camera 1 and the left camera 2, respectively. In other words, referring to FIG. 6, when object A is located further from the cameras than object B, the convergence angle θ1 for the object A is smaller than the convergence angle θ2 for the object B. As a result of the control of these convergence angles, an observer can obtain a well-defined stereoscopic view from the images of the right and left cameras 1, 2 for both distances.

However, it is difficult to control the convergence angle mechanically due to the complicated mechanical system needed for adjusting the convergence angle required to obtain a stereoscopic view. Furthermore, such a mechanical system is relatively expensive.

SUMMARY OF THE INVENTION

One object of the present invention is to provide a stereoscopic imaging system in which the convergence angle for an object is controlled according to the distance between the object and the s imaging system.

Another object of the present invention is to provide a stereoscopic imaging system in which a convergence angle for an object is electronically controlled.

These and other objects of the present invention are achieved by a stereoscopic imaging system having a first and second imaging device. The first and the second imaging devices have a predetermined convergence angle there between for a particular object. A distance detecting apparatus detects a distance from the first and the second imaging devices and to an object for imaging. A first electronic zooming apparatus receives a signal from the first imaging device and extracts an image projecting over a predetermined area of a first imaging device. A second electronic zooming apparatus receives a signal from the second imaging device and extracts an image projecting over a predetermined area of a second imaging device. A control device controls the location of the projected images on the imaging devices according to the distance information.

In accordance with one aspect of an embodiment of the present invention, the distance detecting apparatus provides a measurement of the distance between a focused object and the imaging devices. According to the the measurement, the images projected onto the imaging devices are adjusted so that the focused object is located at the center of each of the provided image frames. As a result, the convergence angle is substantially changed according to the measured distance between the object and the imaging device.

DETAILED DESCRIPTION OF THE PREFERRED EMBODIMENTS

Figure 1:
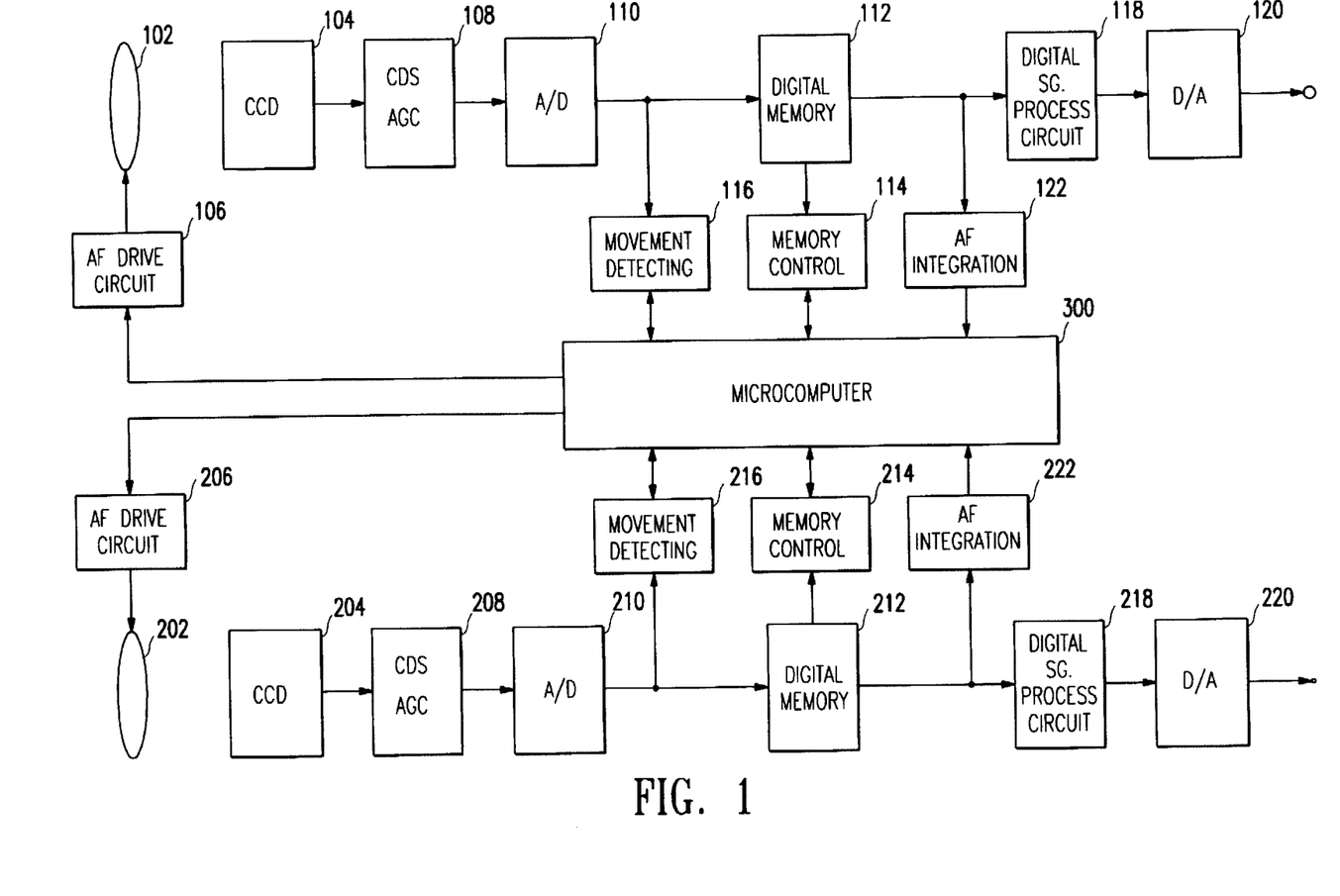
FIG. 1 is a block diagram of an embodiment of the present invention.
Figure 2A:
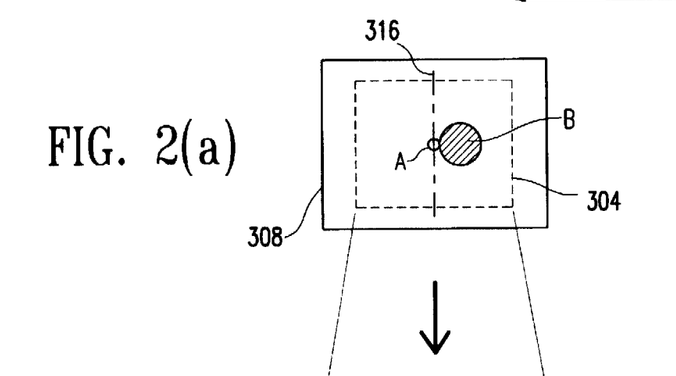
FIGS. 2(a), 2(b), 2(c) and 2(d) are illustrative views showing the operation of an embodiment of the present invention.
Figure 2B:
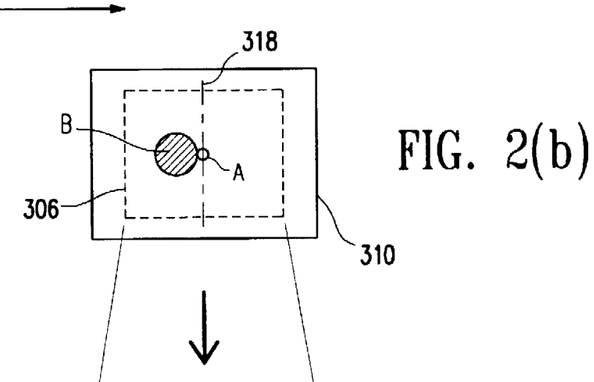
Figure 2C:
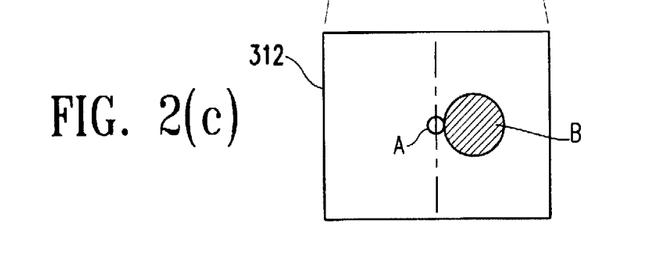
Figure 2D:
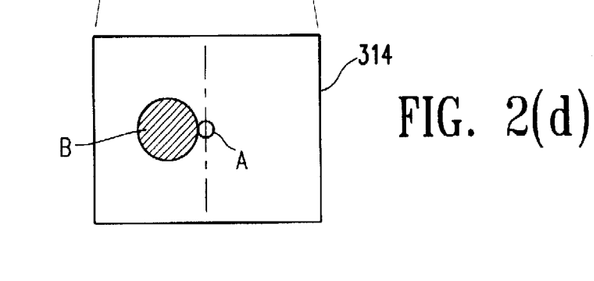

FIG. 1 is a block diagram of a preferred embodiment of the present invention. This embodiment has two circuits, one for a right camera and one for left to achieve a stereoscopic image. For convenience, the following explanation will primarily concern the circuitry for the right camera as it is understood that the circuitry for the left channel is essentially the same.

An imaging lens 102 focuses the image of an object on an imaging device 104. In this embodiment, a charge coupled device (CCD) is used as the imaging device 104 which provides an output signal corresponding to one field picture at a 60 Hz rate or 60 field pictures in one second. It will be appreciated that the standard television signal, such as, for example, an NTSC signal, provides for video images at 60 Hz. An auto focusing drive circuit 106 controls the movement of the imaging lens 102 for focusing the object's image on the imaging device 104. A signal processing circuit 108 processes an output signal from the CCD 104. The signal processing circuit 108 includes a correlation double sampling (CDS) circuit and an automatic gain control (AGC) circuit. An A/D converter 110 converts an analog signal provided by the signal processing circuit 108 into a digital signal.

A digital memory 112 receives the digital signal from the A/D converter 110. The digital memory 112 has a capacity of storing data from a digital signal corresponding to each sequential picture field. A memory control circuit 114 controls write and read operations of the digital memory 112. The movement detecting circuit 116 compares each field picture with the previous field picture to detect unintentional movement of the stereoscopic imaging system from the user holding it. A digital signal processing circuit 118 receives a digital signal provided by the digital memory 112. The digital signal processing circuit 118 processes the digital signal from the digital memory 112 to provide a standard video signal, such as, for example, an NTSC color signal. A D/A converter 120 converts the digital signal output from the digital signal processing circuit 118 into an analog video signal. An auto focus (AF) integration circuit 122 receives the digital output signal stored in the digital memory 112 and integrates the high frequency elements (components) of the digital output signal for auto focusing. In this embodiment, auto focusing is achieved by a method in which high frequency elements of the video output signal is maximized. This method is based on the principle that the high frequency elements of a video signal are greater for in-focus status than for out-of-focus status.

As discussed above the digital memory 112 stores a digital signal corresponding to each sequential field picture which is provided by the CCD 104. In one embodiment, the CCD 104 comprises an array of picture elements to define one field picture. For each writing operation controlled by the memory control circuit 114, the digital memory 112 stores digital information corresponding to one array of picture elements of the CCD 104. The digital memory 112 has a predetermined number of memory regions. The predetermined number of the memory region is at least the number of picture elements of the CCD 104. Each memory region stores the digital information of one picture element. Further, each memory region has one unique address. Specific digital information for a specific picture element of the CCD 104 can be obtained from the digital memory 112 by using the appropriate address.

The digital memory 112 defines a read-out region in memory which is smaller in size than the storage capacity of the digital memory 112. When the stored information is retrieved from the digital memory 112 for electronic zooming and convergence angle control, the memory control circuit 114 controls the digital memory 112 to read out information corresponding only to the read-out region.

Further, the information from the read-out region is compensated and converted into a full size picture corresponding to all of the CCD picture elements. A zoom ratio is changed to vary the size of the read-out region to match the full size picture. In a preferred embodiment, the position of the read-out region within the the memory of digital memory 112 may be changed to control a convergence angle of two cameras or two imaging lenses 102 and 202 with respect to an object. As described above, since each memory region in the digital memory 112 has an address, the position change is achieved by changing a start address for the read-out region. Further, the position change is achieved along a direction of the arrangement of the two images on the respective CCDs.

As described above, the numerals 102–120 denote elements for circuitry for the right eye. Numerals 202–220 denote elements for circuitry for the left eye. Explanation for the elements 202–220 is omitted because those elements are substantially the same as elements 102–120.

A micro-computer 300 controls the operation of the stereoscopic imaging system. The micro-computer 300 receives the movement detecting signal from the movement detect circuits 116 and 216. The micro-computer 300 also receives an auto focus signal from the AF integration circuits 122 and 222. Further, the micro-computer 300 provides AF control signals to AF drive circuits 106 and 206 to control focusing of the imaging lenses 102 and 202 in response to the output of the AF integration circuits 122 and 222, respectively. The micro-computer also controls the operation of the memory control circuits 114 and 214.

Referring to FIGS. 2 and 3, a convergence angle control method in accordance with one embodiment of the present invention is described. In FIGS. 2 and 3, there are a distant object A and a close object B. A direction 302 is the direction of arrangement of the cameras. In this embodiment, the direction 302 coincides with a horizontal direction of the CCD 104 and 204. The stereo-graphic apparatus has a convergence angle adjusted to the distant object A. Further, an electronic zooming ratio is selected to be 1.5 (one and half). An electronic zooming is based upon the size of the image projected onto the imaging device 104 and the size of the read-out region. This zooming ratio is selected for the convenience of explanation.

First, when focusing is made on the distant object A, as shown in FIGS. 2 (a) and (b), the distant object A is located at the center of each image 308 and 310 projected onto the CCD's 104 and 204, respectively. This is because the convergence angle is adjusted to the distant object A and focusing is made on any object located on the center region of the image in this embodiment. Therefore, in the electronic zooming operation, a predetermined area (designated by dotted lines 304 and 306) located on the center part of each of the images 308 and 310 in FIGS. 2(a) and 2(b) is extracted and enlarged. As a result, images 312 and 314 (shown in FIGS. 2(c) and 2(d) are used for a left camera image and a right camera image, respectively. In the enlarged images, as shown in FIGS. 2(c) and 2(d), the distant object A is still located on the center of each of the images. In this case, it is not necessary to correct the convergence angle.

Figure 3A:
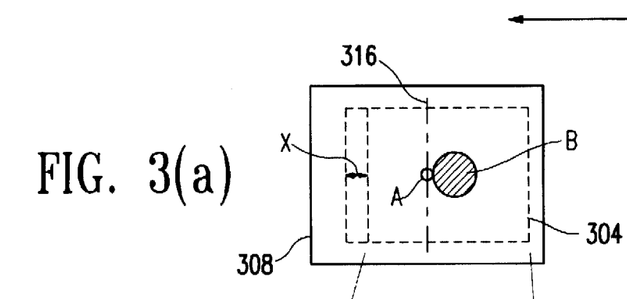
FIG. 3(a), 3(b), 3(c) and 3(d) are illustrative views showing the operation of an embodiment of the present invention.
Figure 3B:
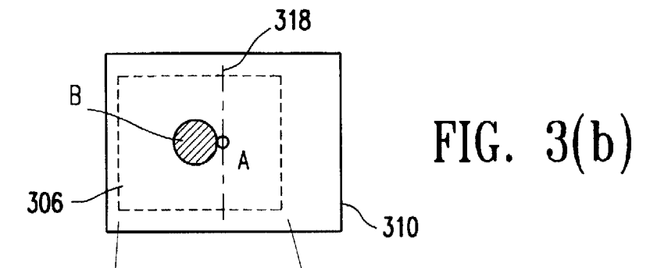
Figure 3C:
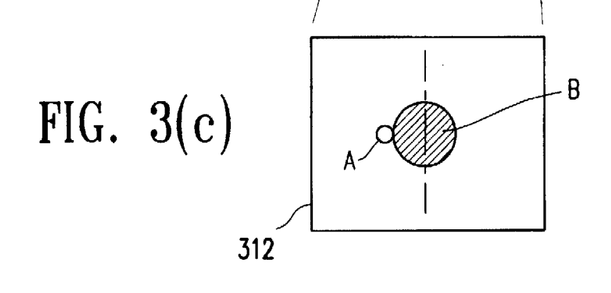
Figure 3D:
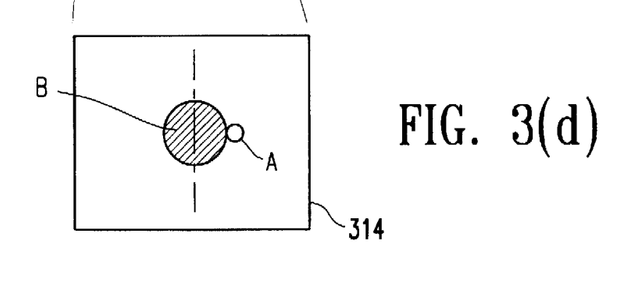

Next, the zooming operation with respect to the close object B is described. The convergence angle of the two cameras is not matched to the close object B but to the distant object A. Therefore, if the close object B is located on a center line between the two cameras, the close object B is not located on the center parts (designated by alternate long and short dashed lines 316 and 318, respectively) of each of the images 308 and 310. It is necessary to reposition each extracting area 304 and 306 for centering the close object B in the images 308 and 310 obtained from the two cameras. The areas 304 and 306 (designated by dotted line) are extracting areas. As shown in FIGS. 3(c) and 3(d), the close object B is projected onto the center part of each of the images 312 and 314 of the right camera and the left camera, respectively. Therefore, the convergence angle of the two cameras is apparently matched to the close object B.

Figure 4:
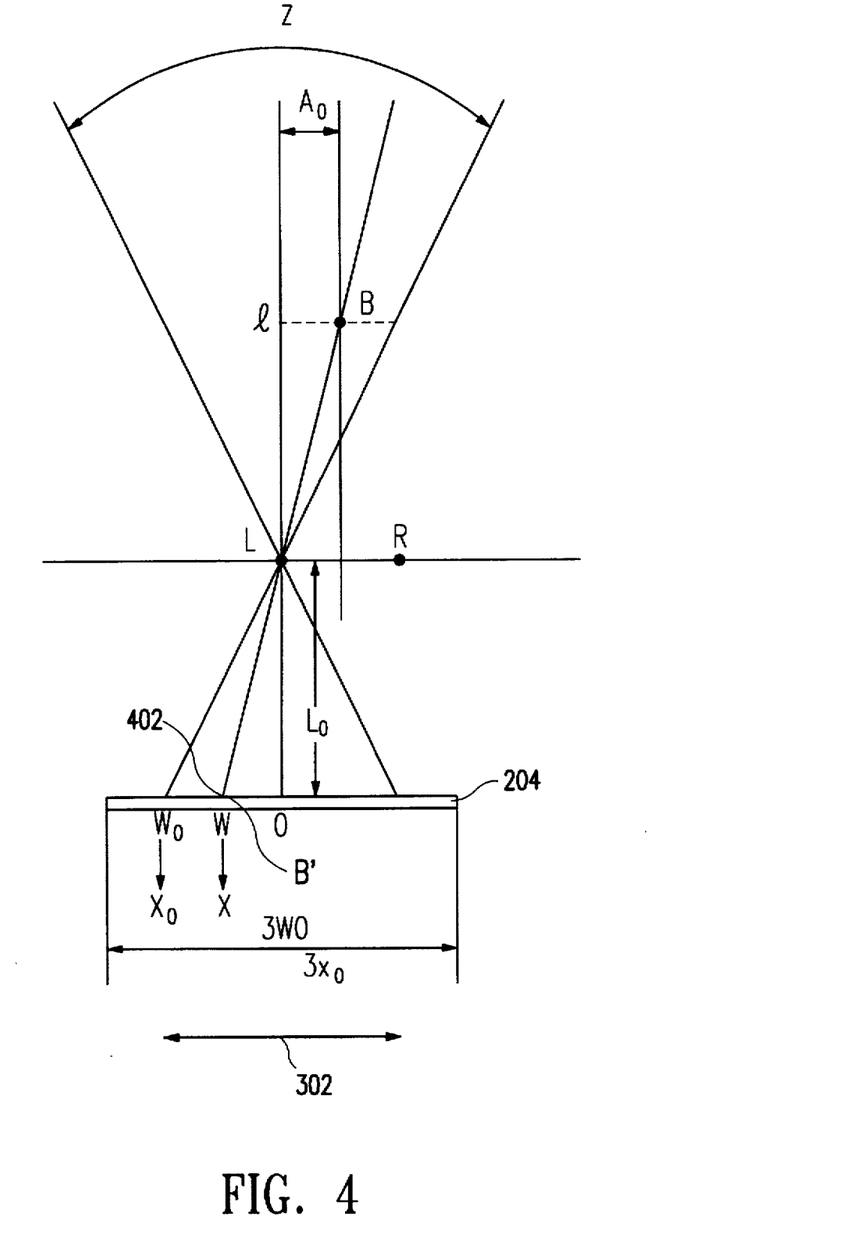
FIG. 4 is an explanatory view illustrating a method of an embodiment of the present invention for deciding how much to shift the imaging frame to center the projected image.
Figure 5:
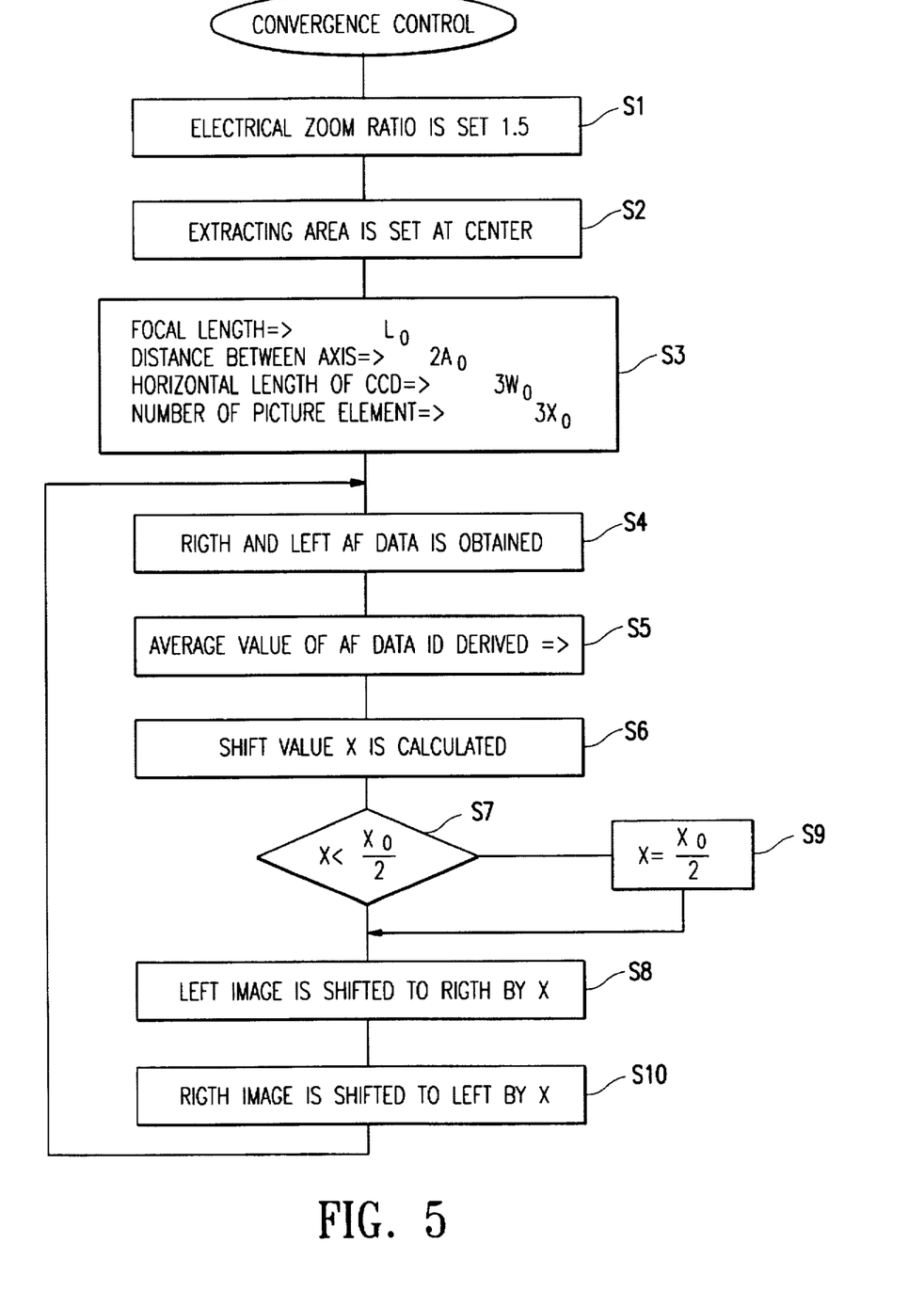
FIG. 5 is a flow chart showing the operation of an embodiment of the present invention.

Referring to FIGS. 4 and 5, the convergence angle control of one embodiment is described. The optical axes of two cameras are in parallel with each other therefore the actual convergence angle of the two cameras is 0 degrees. No mechanical convergence system is required. Instead, the position of the image is centered on the extracting area of the CCD.

In FIG. 4, the center of the left camera (or the imaging lens 204) is located on a point L, and the center of the right camera (or the imaging lens 104) is located on a point R. The distance between points L and R, which is the distance between the optical axis of the left camera and the optical axis of the right camera, equals a length $2A_0$. The length $2A_0$ is preferably about 65 millimeters(mm) which that is nearly the average distance between the human eyes. Let us suppose that the horizontal length of CCD 204 is $3W_0$, the number of the picture elements along the horizontal direction 302 is $3X_0$, the focal length of the two imaging lenses of the left and right camera is $L_0$, a maximum imaging range is Z, and the electronic zooming ratio is set at 1.5. The length of an imaging area on the CCD determined by the maximum imaging range is $2W_0$ ($3W_0/1.5$).

The close object B is located from imaging lenses L and R a distance l. When the system focuses on close object B, as described above, the image of the object B does not project onto the center o of the CCD 204, but onto a point 402 which is separated from the center o by a distance W. The distance W corresponds to a number X of picture elements of the CCD 204 along the direction 302. In the extracting operation for electronic zooming, the extracting area is shifted by the number X to the left (in FIG. 4). As a result, the image of the object B is centered on the image 312 in FIG. 3 (c). In the case of the right camera, the extracting area is shifted by the number X to the right (in FIG. 4).

Next, the derivation of the number X will be described. As shown in FIG. 4, triangles defined by LOW and LIB are similar. The following equation shows this relationship.

$$W:A_0=L_0:l$$

Consequently, as $W/L_0=A_0/l$, $$W=(L_0*A_0)/l \quad \text{(equation A)}$$

Supposing that a number of picture elements per unit length at the CCD 204 is k, W and $W_0$ can be expressed as follows.

$$W=k*X$$

$$W_0=k*X_0$$

The following equation is derived from the above two equations.

$$W/W_0=X/X_0$$

Therefore, $$X=W*X_0/W_0$$

The following equation is further derived from the above equation and the equation A.

$$X=(L_0*A_0/l)*X_0/W_0=(L_0*X_0*A_0/W_0)/l$$

Holding the values of $L_0$, $X_0$, $A_0$ and $W_0$ constant in the last equation, the number X of picture elements to be shifted is inversely proportional to the distance l between the imaging lens and the object B.

FIG. 5 shows a flow chart of the convergence control operation in accordance with one embodiment. First, the electronic zoom ratio is set at 1.5 in step S1. A horizontal position of the extracting area is set at a predetermined position corresponding to the center position of the extracting area in step S2. In step S3, predetermined values concerning the convergence angle control are set in memory. Namely, the separation of the two optical axis of the two cameras is set at $2A_0$, the horizontal length of the CCD is set at $3W_0$, the number of picture elements of the CCD along the horizontal direction is set at $3X_0$, and the focal length is set at $L_0$.

In the following step S4, right and left AF data is obtained. The data of each of the right and the left AF may be proportional to the distance l between the imaging lens and the object. The AF data of the two channels may be averaged in step S5. Based upon the average value, the shift value x is calculated in step S6.

The derived value x is compared to a predetermined value $X_0/2$ in step S7. Depending on the comparison, the next operation varies. If the value x is larger than the predetermined value $X_0/2$, the value x is set at a predetermined value $X_0/2$ in step S9. If the value x is smaller than the predetermined value $X_0/2$, the derived value x is used. This comparison is made because of the maximum shift amount defined by the electronic zooming ratio. For an electronic zooming ratio of 1.5 and a horizontal length of the maximum imaging area of $2X_0$, a possible movable amount in one direction on the CCD is equal to $X_0/2$.

The value x determined in steps S7 or S9 is used in steps S8 and S10. In step S8, the extracting area is shifted to the right by the value x in the electronic zooming operation of the left image. Further, the extracting area is shifted to the left by the value x in the electronic zooming operation of the right image in step S10. After these steps S8 and S10, step S4 through the step S10 are repeated. For AF data generated at every field period such as 1/60 second, the series of steps (from S4 to S10) is repeated every 1/60 second or at a 60 Hz rate.

In the electronic zooming operation, the final output signal is compensated and enlarged by 1.5. However, for convergence angle control, the enlarging operation is not required. Therefore, if the size of the extracting area is equal to the final output size, the extracting operation is sufficient for convergence angle control.

What is claimed is:

1. A stereoscopic imaging system comprising:

a first imaging device having a plurality of first pixels for providing a first analog signal for each first pixel based upon the projection of an object onto an extraction area of the first imaging device;

a second imaging device having a plurality of second pixels for providing a second analog signal for each second pixel based upon the projection of the object onto an extraction area of the second imaging device;

a first analog-to-digital converter for providing a first digital signal based upon the first analog signal;

a second analog-to-digital converter for providing a second digital signal based upon the second analog signal;

a first electronic zooming device, the first electronic zooming device including a first memory device for storing data based upon the first digital signal for representing the projection of the object onto the extraction area of the first imaging device, for zooming the projection of the object onto the extraction area of the first imaging device by a first predetermined scale based upon the stored data representing the projection of the object onto the extraction area of the first imaging device;

a second electronic zooming device, the second electronic zooming device including a second memory device for storing data based upon the second digital signal for representing the projection of the object onto the extraction area of the second imaging device, for zooming the projection of the object onto the extraction area of the second imaging device by a second predetermined scale based upon the stored data representing the projection of the object onto the extraction area of the second imaging device;

a distance detector for measuring a distance from the object to the stereoscopic imaging system to provide a distance measurement based upon at least one of data retrieved from the first memory device and data retrieved from the second memory device; and a controlling device for controlling the effective position of the extraction area of the first imaging device and the effective position of the extraction area of the second imaging device according to the distance measurement by controlling an address for reading data from at least one of the first memory device and the second memory device.

2. The stereoscopic imaging system of claim 1, wherein the first imaging device includes a first optical axis, the second imaging device includes a second optical axis and the first optical axis and the second optical axis are substantially parallel.

3. The stereoscopic imaging system of claim 1, wherein the distance detecting device is a part of an auto-focusing device.

4. The stereoscopic imaging system of claim 1, the stereoscopic imaging system further including:

- a first digital-to-analog converter for generating a third analog signal based upon data retrieved from the first memory device according to the address; and
- a second digital-to-analog converter for generating a fourth analog signal based upon data retrieved from the second memory device according to the address.

5. The stereoscopic imaging system of claim 1, wherein the distance detector determines a measurement of the distance from the object to the stereoscopic imaging system based upon data retrieved from at least one of the first memory device and the second memory device.

6. A method for providing a stereoscopic image of an object, the method comprising:

- providing a first analog signal for each of a plurality of first pixels of a first imaging device based upon the projection of the object onto a first extraction area defined over the first pixels;
- providing a second analog signal for each of a plurality of second pixels of a second imaging device based upon the projection of the object onto a second extraction area defined over the second pixels;
- providing a first digital signal based upon the first analog signal;
- providing a second digital signal based upon the second analog signal;
- storing in a first memory device data representing the projection of the object onto the first extraction area based upon the first digital signal;
- electronically zooming the projection of the object onto the first extraction area by a first predetermined scale based upon the stored data representing the projection of the object onto the first extraction area;
- storing in a second memory device data representing the projection of the object onto the second extraction area based upon the second digital signal;
- electronically zooming the projection of the object onto the second extraction area by a second predetermined scale based upon the stored data representing the projection of the object onto the second extraction area;
- measuring a distance from the object to the one of the first imaging device and the second imaging device to provide a distance measurement based upon data retrieved from at least one of the first memory device and the second memory device; and
- controlling the effective position of the first extraction area and the effective position of the second extraction area according to the distance measurement by controlling an address for reading data from at least one of the first memory device and the second memory device.

7. The method of claim 6, the method further including:

- generating a third analog signal based upon data retrieved from the first memory device based upon the address; and
- generating a fourth analog signal based upon data retrieved from the second memory device based upon the address.

8. The method of claim 6, the method further including:

- providing the first analog signal for each of the of first pixels of the first imaging device, the first imaging device having a first optical axis; and
- providing the second analog signal for each of the second pixels of the second imaging device, the second imaging device having a second optical axis substantially parallel to the first optical axis.

9. The method of claim 6, the method further including determining a measurement of the distance from the object to the stereoscopic imaging system based upon data retrieved from at least one of the first memory device and the second memory device.

* * * * *